3,433,356
RECOVERY OF WIRE FROM PLASTIC INSULATION
Don A. Sommer, Edison, and Joseph F. Doerwang, Union, N.J., assignors, by mesne assignments, to Engelhard Minerals & Chemicals Corporation, Edison, N.J., a corporation of Delaware
No Drawing. Filed Aug. 11, 1966, Ser. No. 571,727
U.S. Cl. 209—164      9 Claims
Int. Cl. B03d 1/04

---

ABSTRACT OF THE DISCLOSURE

Wire is separated from plastic in insulating scrap wire by a flotation process carried out in a quiescent pulp and utilizing air originally dissolved in a pulp of the ground insulated scrap. The plastic floats and the metal remains in the pulp.

---

This invention is concerned with the separation and recovery of metal, especially copper wire, from plastic matter in scrap or waste.

For economic reasons, it is desirable and frequently essential to recover and reclaim metal, especially copper, in scrap metal such as insulated wire and cable. It is the practice in some plants to remove the plastic insulation by burning it off the wire and then reclaim copper from the residue. This practice has limited utility with some of the newer plastic coating materials since these materials burn with difficulty. Further, in some cases the fume problem rules out such a method of reclaiming the metal values in the scrap.

Attempts have been made to apply the principles of froth flotation, as practiced by metallurgical industry, to separate the plastic from the wire in chopped scrap by floating the plastic from the wire. Surprisingly, the results were generally unsuccessfull. The copper metal and plastic both tended to float when the scrap was pulped in water and the pulp was subjected to subaeration in the presence of a frothing agent. Consequently, there was little or no concentration of the metal in the flotation tailings, as would be expected.

Accordingly, it is an object of this invention to provide a simple method for separating wire from plastic in scrap insulated wire.

A more specific object is to separate metal wire, especially copper, from plastic coating material by selectively floating the plastic from the wire in a manner such that the wire does not float.

We have discovered or invented a simple procedure for separating and recovering wire from plastic in scrap coated wire. The procedure involves the selective flotation of the plastic from the wire and the recovery of the wire from nonfloated matter.

Stated briefly, in accordance with this invention, scrap insulated wire that is chopped to the extent that the wire is liberated from the plastic coating is pulped in an aqueous liquid. While the pulp is maintained in a generally quiescent state or condition (i.e., free from strong mechanical agitation or subaeration, such as is used in conventional froth flotation), the aqueous pulp is subjected to conditions of pressure and temperature such that air originally dissolved in the water in said pulp goes out of solution and forms bubbles. This result can be effected, for example, by mildly heating the pulp in an open vessel (autogenous pressure) or by subjecting the pulp to vacuum treatment at ambient temperature. The rate at which air bubbles are evolved is controlled to prevent substantial boiling or ebullience in the pulp. The air bubbles rise in the quiescent pulp, carrying the plastic particles to the surface of the pulp where they are removed The wire remains in the pulp since, under the quiescent conditions that prevail, the wire particles do not attach to air bubbles and float. The scum or froth can be discarded and the solids in the pulp (tailings) separated from the water and further processed, as desired, to reclaim the metal in a suitable form.

The selective flotation of the plastic pieces from the chopped wire is enhanced substantially by incorporating into the pulp an agent which maintains the floatability of the plastic gangue (i.e., a material, such as a surface active material, which maintains the plastic at the air-liquid interface after the particles have been buoyed to the surface of the pulp). This facilitates the removal of the plastic pieces from the surface of the pulp.

Substantially complete separation of metal wire from plastic can be realized by the practice of the invention. However, for most operations complete separation is not a necessity. Small amounts of plastic in the metal concentrate can be removed by burning, since the amount of combustible matter is extremely small in comparison to the amount of combustible matter originally associated with metal in the tailing product. Other means, such as gravity concentrations, can be used to remove residual plastic from the metal concentrate. It is more important to realize a high recovery of the metal values, especially the copper, in the scrap because of the commercial value of the reclaimed metal. An advantage of our process is that exceptionally good metal recovery is realized with very modest reagent and processing costs.

The invention is applicable to the treatment of plastic coated wire (including cable) of the type in which the plastic can be liberated or removed from the wire by mechanical means. Generally speaking the plastics are of the thermoplastic type and the wire is coated by extrusion. The following are plastics used in making plastic coated wire: poly(vinyl chloride), polyethylene, cellulose acetate butyrate, nylon, epoxy resins, "Teflon," and chlorinated polyethers. The metals that can be concentrated include copper and other metals that are denser than water.

The scrap can be ground to liberate the wire from the plastic coating by any suitable procedure, such as, for example, the grinding and pulverizing procedure described in U.S.2,879,005 to Jarvis. The size of the ground scrap is not critical since the separation of the plastic from the metal is effected on the basis of chemical composition, not size. In a representative sample of a mixture of ground scrap insulated wires having an outside diameter of about ⅛", most of the plastic pieces were in the form of split cylinders about ¼" long and the wire pieces varied in size from a powdered state or condition to pieces ranging from ¼" to ¾" long.

Scrap containing a mixture of plastics and/or a mixture of metals can be processed since solid plastics as a class float in the process and the metal wire pieces remain in the body of the pulp. Copper metal can be separated from other metals in the tailings by chemical methods appropriate to the metals present.

Before subjecting a pulp of the ground scrap flotation, in accordance with this invention, it may be economically advisable to preconcentrate the plastic from wire in the ground scrap gravity concentration, such as an air table.

The water with which the chopped or ground scrap is pulped can be at ambient temperature and contains air normally dissolved in water. If desired, the water can be aerated before use (this is suggested when the water for the concentration is recirculated in the plant).

The quantity of water employed is not critical but must be at least sufficient to cover completely the chopped scrap and form a fluid aqueous pulp therewith.

When carrying out the process by heating under autogenous pressure, the pulp is charged to a vessel provided with means for heating the charge and means, such as scraper blades, for removing the plastic particles from the surface of the pulp. Preferably, the means for removing the buoyed particles is capable of operating on a continuous basis so that the particles are removed soon after they report on the surface of the pulp.

As mentioned, the pulp is heated while it is maintained quiescent by avoiding subaeration, mechanical agitation or substantial boiling. Since the solubility of air in the pulp varies inversely with temperature, the application of heat results in formation of air bubbles in the pulp. These bubbles rise to the surface of the pulp. The plastic particles are hydrophobic and air-avid. Therefore, the particles adhere to the air bubbles as they are formed. Generally, each particle adheres to a multiplicity of bubbles and is buoyed upwardly through the pulp. In the absence of subaeration the metal particles are not sufficiently air-avid to be buoyed at the surface of the pulp and they remain within the body of the pulp, generally at the base of the pulp.

In carrying out the embodiment of the invention wherein the pulp is aerated by holding the pulp under reduced pressure, the heating means can be omitted and suitable pumps employed.

No oiling (collector) reagents such as fatty acids or long-chain amines are used in the process. However, the pulp should contain an agent to maintain the plastic particles floatable, as mentioned above. Such material can be a water-soluble surface active agent capable of reducing the surface tension of the water. Surfactants having wetting and/or frothing properties are useful. Mixtures of wetters and frothers can be used. The following are examples of surface active agents: alkyl aryl sulfonates, exemplified by dodecybenzenesulfonate; fatty acid sulfates, such as sodium octyl sulfate; esters of sodium sulfosuccinic acid, such as the bis(2-ethylhexyl) ester; sodium salts of sulfated monoglycerides, such as the surfactants made by esterifying fatty acids from coconut oils in the presence of excess glycerin; pine oil; and fatty alcohols, such as methyl isobutyl carbinol.

Another reagent which maintains the floatability of the plastic particles is sulfuric acid. The reason for the phenomenon is not presently understood although the presence of the acid in the pulp of the ground scrap has the same effect as a surface active agent. It is theorized that the acid reacts with constituents of the plastic to form a surface active material.

The initial temperature of the water used in the pulping step is not critical. However, since the solubility of air varies inversely with temperature, liquid water as cold as possible is suggested. The initial water temperature should be well below 100° F. since the solubility of air is quite low at temperature of this order. Tap water, which usually has a temperature within the range of about 35° F. to 70° F., is suitable.

Good results have been realized with external heating of the pulp at a relatively slow rate (about 3° F./minute) in order to prevent the overrapid development of air bubbles with resulting entrapment of metal. The invention, however, is not limited to such a rate of heating. Generally speaking, the pulp should be maintained below about 220° F. to avoid ebullience.

The following examples illustrate the application of the process of the invention to the reclamation of copper wire from tabled, ground scrap insulated wire. The scrap contained a mixture of plastics and the metal was predominantly copper, mostly fine diameter copper wire about ¼" to ½" long. The plastic particles were largely in the form of split cylinders, about ⅛" diameter and ¼" long. The copper content of a representative sample of the tabled material was 23.4% by weight. The total metal content was 25.7%.

Example I

A 21.3 gram sample of the chopped insulated wire was placed in an open 600 ml. beaker and 500 ml. of 10% sulfuric acid solution was added. The contents of the beaker were mildly stirred with a glass rod for about thirty seconds. A small amount of material that floated was skimmed off. The open beaker was then gently heated. When the temperature reached 106° F., material began to float and was continuously skimmed off as it floated. The heating was continued for 27 minutes (after the contents of the beaker reached 106° F.), during which time boiling was avoided. At the end of the 27 minute period, the contents of the beaker were at 200° F. The material left in the beaker was rinsed with tap water, decanted and dried at 175° F. Water was decanted from the material that had been skimmed off during the treatment. This material was dried at 175° F. for purposes of analysis. From the weight of the floated gangue and the weight of the metal residue, it was calculated that 25.4% of the charge was recovered in the metal concentrate. From this end the fact that the plastic concentrate was substantially free from metal, it was concluded that the process resulted in an excellent recovery of the metal.

Example II (a) Example I was repeated with the exception that 0.4 milliliter of "Aeresol OT" in 500 milliliters of tap water was used in place of the 10% solution of sulfuric acid. "Aeresol OT" is a 1% solution of sodium bis(2-ethylhexyl) sulfosuccinate. The quantity of "Aeresol OT" employed corresponds to 1.0#/ton of charge. As in Example I, the plastic scrap floated and the metal wire remained in the beaker, producing a metal concentrate substantially free from visible plastic and a float product substantially free from metal. The results are as follows:

| Product | Wt. (g) | Percent Wt. |
|---|---|---|
| Float (plastic) | 23.6 | 68.6 |
| Residue (metal) | 10.8 | 31.4 |
| | 34.4 | 100.0 |

Example III

The process of Example I was repeated with 3.6 grams of scrap and 300 milliliters of water to which 2 drops of "Aerofroth" (methyl isobutyl carbinol) had been added. Gravimetric analysis showed that 36.1% of the charge reported in the metal concentrate.

We claim:

1. A method for separating copper wire from plastic insulation material in ground plastic insulated scrap which comprises pulping the ground scrape with cold water, while maintaining the pulp quiescent, heating the pulp to a temperature at which air originally dissolved in the water forms air bubbles which rise to the surface of said pulp and carry therewith particles of plastic, removing plastic particles from the surface of said pulp, and recovering the copper wire which remains in the pump.

2. The method of claim 1 wherein said pulp has dissolved therein a material capable of maintaining said plastic particles in floatable condition after said plastic particles report on the surface of said pulp.

3. The method of claim 2 wherein said material capable of maintaining said plastic particles in floatable condition is a wetting agent.

4. The method of claim 2 wherein said material capable of maintaining said plastic particles in floatable condition is a frothing agent.

5. The method of claim 2 wherein said material capable of maintaining said plastic particles in floatable condition is a sulfuric acid.

6. The method of claim 2 wherein said pulp is heated under autogenous pressure to a temperature not exceeding 220° F.

7. The method of claim 2 wherein said pulp is originally at a temperature below 100° F. and is heated under autogenous pressure to a temperature not exceeding 220° F.

8. A method for separating metal particles from plastic particles in ground scrap which comprises
pulping the ground scrap with cold water having dissolved therein a material capable of maintaining plastic particles in floatable condition,
while maintaining the pulp quiescent, mildly heating it under autogenous pressure whereby air originally dissolved in the water forms air bubbles which rise to the surface of said pulp and carry therewith particles of plastic,
removing plastic from the surface of said pulp, and recovering the metal remaining in the pulp.

9. A method for separating metal particles from plastic particles in ground scrap which comprises:
pulping the ground scrap with cold water having dissolved therein a material capable of maintaining plastic particles in floatable condition,
while maintaining the pulp quiescent, subjecting it to reduced pressure without heating whereby air originally dissolved in the water forms air bubbles which rise to the surface of said pulp and carry therewith particles of plastic,
removing plastic from the surface of said pulp, and recovering the metal remaining in the pulp.

References Cited

UNITED STATES PATENTS

| | | | |
|---|---|---|---|
| 735,071 | 8/1903 | Delprat | 209—164 |
| 835,479 | 11/1906 | Sulman | 209—164 X |
| 1,101,506 | 6/1914 | Bradford | 209—164 |
| 1,376,459 | 5/1921 | Pedersen | 209—164 |
| 1,578,274 | 3/1926 | Eldred | 209—164 |
| 1,706,281 | 3/1929 | Elmore | 209—166 |
| 2,591,830 | 4/1952 | Klepetko | 209—166 |

FOREIGN PATENTS

| | | |
|---|---|---|
| 29,282 | 12/1904 | Great Britain. |
| 42 | 7/1877 | Germany. |

HARRY B. THORNTON, *Primary Examiner.*

R. HALPER, *Assistant Examiner.*

U.S. Cl. X.R.

209—166